(12) United States Patent
Chen et al.

(10) Patent No.: US 11,119,620 B2
(45) Date of Patent: Sep. 14, 2021

(54) ELECTRONIC DEVICE

(71) Applicant: AU OPTRONICS CORPORATION, Hsin-Chu (TW)

(72) Inventors: Ya-Ting Chen, Hsin-Chu (TW); Sheng-Wen Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/705,680

(22) Filed: Dec. 6, 2019

(65) Prior Publication Data
US 2021/0019005 A1 Jan. 21, 2021

(30) Foreign Application Priority Data
Jul. 15, 2019 (TW) .................................. 108124878

(51) Int. Cl.
*G06F 3/047* (2006.01)
*G06F 3/044* (2006.01)
*H01Q 1/24* (2006.01)

(52) U.S. Cl.
CPC ............ *G06F 3/047* (2013.01); *G06F 3/0445* (2019.05); *H01Q 1/243* (2013.01); *G06F 2203/04112* (2013.01)

(58) Field of Classification Search
None
See application file for complete search history.

(56) References Cited

U.S. PATENT DOCUMENTS

| 2014/0060909 | A1 | 3/2014 | Ullmann et al. |
| 2014/0333555 | A1* | 11/2014 | Oh ................ G06F 3/0446 345/173 |
| 2015/0255856 | A1 | 9/2015 | Hong et al. |
| 2016/0190678 | A1* | 6/2016 | Hong ................ H01Q 1/273 343/700 MS |

(Continued)

FOREIGN PATENT DOCUMENTS

TW  M533263  12/2016

OTHER PUBLICATIONS

Office Action issued by TIPO dated Mar. 6, 2020.
(Continued)

*Primary Examiner* — Stephen T. Reed
(74) *Attorney, Agent, or Firm* — WPAT, PC

(57) ABSTRACT

An electronic device is provided. The electronic device includes a first metal mesh layer, a second metal mesh layer and an insulator. The first metal mesh layer is made up of a plurality of first electrode pattern units. The second metal mesh layer is disposed on one side of the first metal mesh layer, and is made up of a plurality of second electrode pattern units and a plurality of third electrode pattern units. The pattern of the second electrode pattern units and the pattern of the first electrode pattern units are at least partially identical in shape. The insulator is at least partially disposed between the first metal mesh layer and the second metal mesh layer. On a virtual projection surface parallel to the first metal mesh layer, a first vertical projection range projected from the shape of a first electrode pattern units distribution area and a second vertical projection range projected from the shape of a second electrode pattern units distribution area are staggered.

12 Claims, 9 Drawing Sheets

(56) References Cited

U.S. PATENT DOCUMENTS

2017/0139520 A1\* 5/2017 Yeh .................... H01Q 1/2258
2019/0064964 A1\* 2/2019 Choi .................... G06F 3/0443

OTHER PUBLICATIONS

Intellectual Property Office of Singapore "Invitation to Respond to Written Opinion" dated Jun. 18, 2020, Intellectual Property Office of Singapore.
Intellectual Property Office of Singapore "Written Opinion" dated Jun. 16, 2020, Intellectual Property Office of Singapore.
Intellectual Property Office of Singapore "Search Report" dated Jun. 16, 2020, Intellectual Property Office of Singapore.

\* cited by examiner

ELECTRONIC DEVICE

BACKGROUND OF THE INVENTION

1. Field of the Invention

The invention generally relates to an electronic device with a touch-sensitive surface. Particularly, the invention relates to a touch-sensitive electronic device integrated with a wireless communication function.

2. Description of the Prior Art

Near Field Communication (NFC) is a short-range high frequency wireless communication technology that allows electronic devices to perform non-contact point-to-point data transmission. It also allows electronic devices to read short-range wireless communication tags containing product information, and has the advantages of high response speed, high level of security, uniqueness, convenience, etc. Therefore in recent years, manufacturers have been committed to integrating NFC functions into their products such as EasyCard, electronic payment devices, and so on.

Most of manufacturers who manufacture products with NFC functions on the market purchase antenna products directly from antenna manufacturers and then assemble them on their products. Some display panel manufacturers try to configure antennas on display devices; however, considering an antenna's high sensitivity to its surroundings and the visibility of the antenna, most of the manufacturers adopt a non-transparent solid metal antenna circuit, and dispose the antenna outside the active area. However, this configuration usually makes the border of the display panel too wide and thus cannot be applied to products with narrow borders.

Furthermore, even if the NFC antenna is integrated into the touch panel, regardless of whether the NFC antenna is disposed on the upper side or the lower side of the touch panel, it will cause the radiation resistance value to rise and in turn decrease the induced voltage value since the touch electrodes of the touch panel are within the distribution range of the antenna magnetic field, and accordingly it could become a serious interference issue.

On the other hand, traditionally, the touch conductive layer made of indium tin oxide (ITO) touch film is of a crystalline ceramic material, which is hard and brittle, and, after hard or multiple times of bending, will cause dramatic increase in radiation resistance value, which in turn will impair the touch function. Therefore, manufacturers started to research alternative materials such as metal mesh. A metal mesh is made by forming a conductive metal mesh pattern on a substrate using silver, copper, or silver oxide. Compared to the ITO touch film, a metal mesh has a lower manufacturing cost and better touch performance. However, when a metal mesh is used in a display panel, moiré effect would occur, which affects visibility. The moiré effect is the interference ripple pattern generated from the overlapping of the regular alignment pattern of the metal mesh of the touch layer of the touch panel and the black matrix of the display device and the color filter layer; that is, bright and dark stripes can be seen on the screen at some angles.

SUMMARY OF THE INVENTION

It is an object of the invention to provide a touch electronic device integrated with wireless communication functions, and such wireless communication functions are integrated into the touch panel.

It is another object of the invention to provide a touch electronic device integrated with wireless communication functions which can reduce interference from wireless communication signals.

It is still another object of the invention to provide a touch electronic device which can reduce the generation of interference fringes to enhance the display effect.

In one embodiment, the invention provides an electronic device. The electronic device includes a first metal mesh layer, a second metal mesh layer and an insulator. The first metal mesh layer is made up of a plurality of first electrode pattern units. The second metal mesh layer is disposed on one side of the first metal mesh layer, and is made up of a plurality of second electrode pattern units and a plurality of third electrode pattern units. The pattern of the second electrode pattern units and the pattern of the first electrode pattern units are at least partially identical in shape. The insulator is at least partially disposed between the first metal mesh layer and the second metal mesh layer. On a virtual projection surface parallel to the first metal mesh layer, a first vertical projection range projected from the shape of the first electrode pattern units distribution area and the vertical projection range projected from the shape of the second electrode pattern units distribution area are staggered.

DETAILED DESCRIPTION OF THE PREFERRED EMBODIMENT

Figure 1:
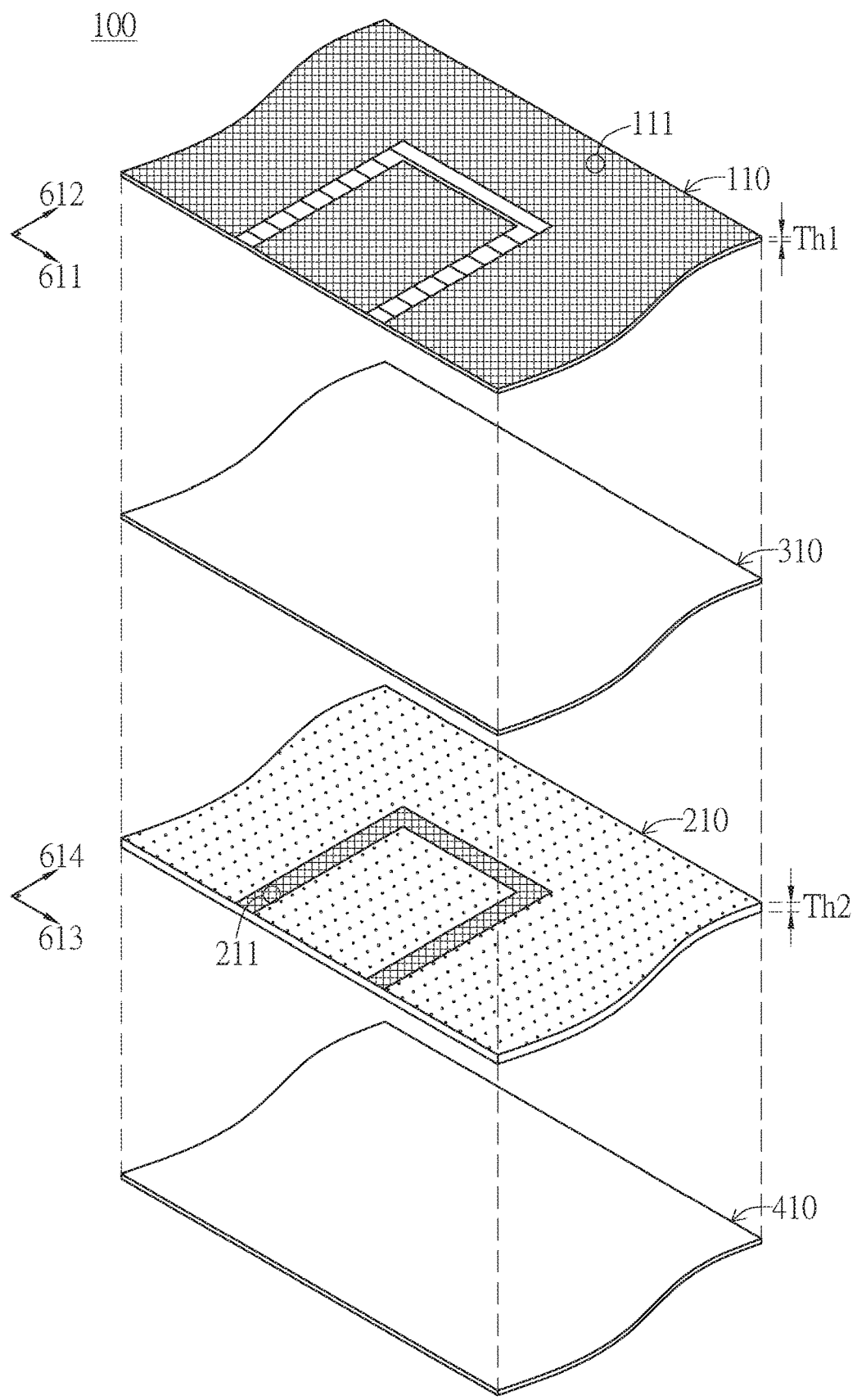
FIG. 1 is an exploded view of a schematic diagram of an embodiment of the relationship between the layers of an electronic device.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and such practice does not depart from the teaching of the present disclosure.

In addition, relative terms such as "below" or "bottom" and "above" or "top" may be used herein to describe the relationship of one element to another, as illustrated. It should be understood that the relative terms are intended to encompass different orientations of the device in addition to the orientation shown in the drawings. For example, if the device in the drawings is turned over, the elements described as being "below" the other elements will be oriented on the "upper" side of the other elements. Therefore, the exemplary term "below" may encompass the orientation of "below" and "above" depending on the particular orientation of the drawing. Similarly, if the device in the drawings is turned over, the elements described as being "above" the other elements will be oriented on the "lower" side of the other elements. Therefore, the exemplary term "above" may encompass the orientation of "above" and "below" depending on the particular orientation of the drawing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

FIG. 1 is an exploded view of a schematic diagram of an embodiment of the relationship between layers of an electronic device. The electronic device sequentially includes a first metal mesh layer 110, an insulator 310, a second metal mesh layer 210 and a substrate 410. The insulator 310 is at least partially sandwiched between the first metal mesh layer 110 and the second metal mesh layer 210. The second metal mesh layer 210 is disposed on one side of the first metal mesh layer 110. Please refer to FIG. 1. The second metal mesh layer 210 is disposed on the side of the insulator 310 other than the first metal mesh layer 110 side, and the second metal mesh layer 210 is disposed between the first metal mesh layer 110 and the substrate 410.

In one embodiment, the electronic device 100 is an electronic device integrated with touch function and wireless transmission function such as a mobile phone, a tablet computer, or a display device. In one embodiment, the wireless transmission is NFC wireless transmission. In one embodiment, the first metal mesh layer 110 may include a touch circuit, and the second metal mesh layer 210 include the function of an antenna layer and may provide the electrical connection function required for the touch circuit in the first metal mesh layer 110. Both the first metal mesh layer 110 and the second metal mesh layer 210 are at least partially within the active area of the display panel of the electronic device 100. In one embodiment, the metal mesh of the first metal mesh layer 110 and the second metal mesh layer 210 is made of a metal with better conductivity, such as copper or aluminum.

Figure 2:
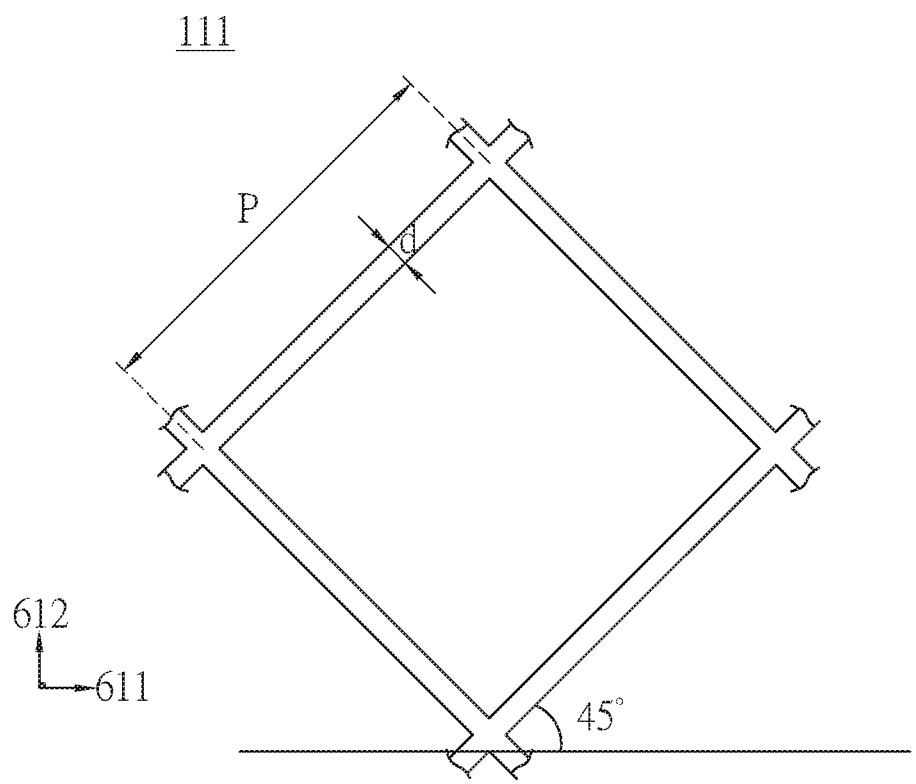
FIG. 2 is a schematic diagram of an embodiment of a first electrode pattern unit.

FIG. 2 is a schematic diagram of an embodiment of a first electrode pattern unit 111. In one embodiment, the pattern of the first electrode pattern unit 111 is a mesh or at least partially a mesh. In an embodiment, the mesh of the first electrode pattern unit 111 is a diamond-shaped mesh. A first mesh pitch P is the distance between the centers of two adjacent metal wires of the first electrode pattern unit 111, and a first wire width d is the diameter of a metal line of the first electrode pattern unit 111, as shown in FIG. 2. The smaller the first mesh pitch P, the smaller the resistance value, and the lower the light transmittance. Hence the minimum transmittance of the first mesh pitch P is obtained at the lowest acceptable transmittance of the product in general. In one embodiment, the first mesh pitch P can be 60±5 μm to strike a balance between resistance value and transmittance.

A second electrode pattern unit 211 also has a second wire width d' and a second mesh pitch P'. The definition and the specific embodiment of the second wire width d' and the second mesh pitch P' are the same as the first wire width d and the first mesh pitch P, as shown in FIG. 2. In a specific embodiment, the wire width of the first wire width d is identical to that of the second wire width d'. In a specific embodiment, the mesh pitch of the first mesh pitch P is identical to that of the second mesh pitch P'.

In one embodiment, as shown in FIG. 2, one of the sides of the mesh of the pattern of the first electrode pattern units 111 is at an angle of 45 degrees to one of the sides (such as the first direction 611 or the second direction 61) of the active area of the electronic device 100. The moiré effect is the slightest when the metal mesh is a diamond-shaped mesh and one of the sides of the diamond-shaped mesh is at an angle of 45 degrees to one of the sides of the active area of the electronic device 100.

Figure 3A:
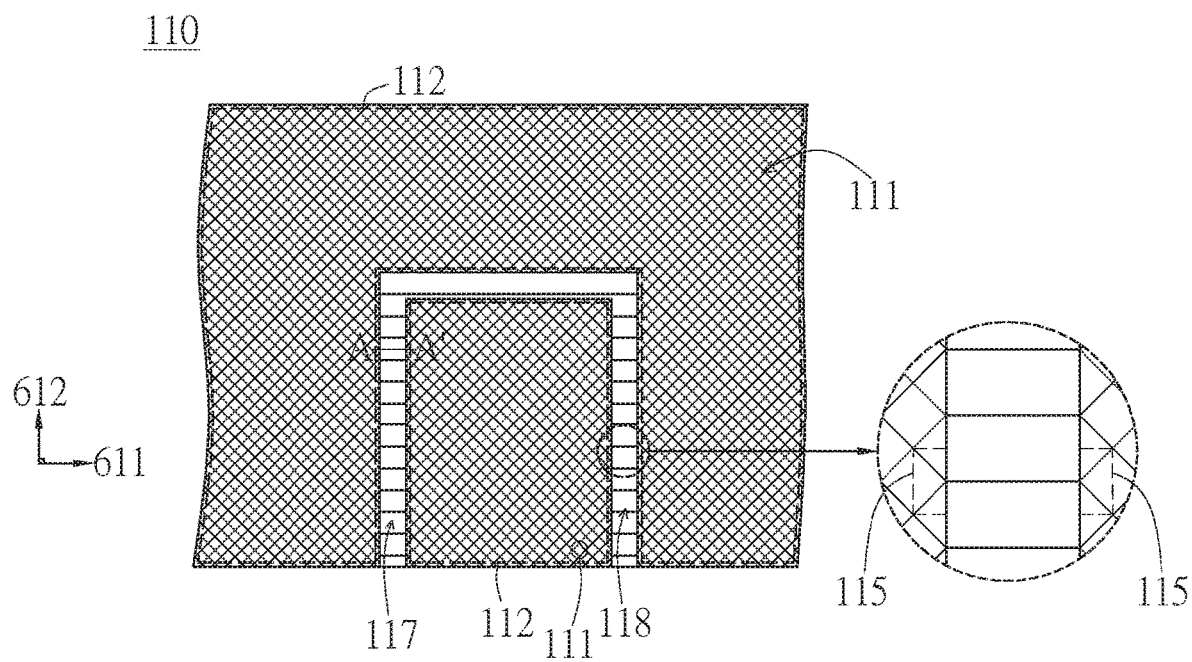
FIG. 3A is a schematic diagram of an embodiment of a first metal mesh layer.

FIG. 3A is a schematic diagram of an embodiment of a first metal mesh layer 110. The first metal mesh layer is made up of a plurality of first electrode pattern units 111. In other words, the first electrode pattern units 111 may be regarded as being distributed in the first metal mesh layer 110 to form a first electrode pattern units distribution area 112 (the diamond-shaped plaid area in FIG. 3A). In addition to the first electrode pattern units distribution area 112, the first metal mesh layer 110 further includes a non-first electrode pattern units distribution area 118 (the horizontal striped area in FIG. 3A), which is staggered with the first electrode pattern units distribution area 112. In one embodiment, the first electrode pattern units 111 are arranged in the first direction 611 and the second direction 612 respectively, and are distributed in an array to form the first metal mesh layer 110, as shown in FIG. 3A. The first direction 611 and the second direction 612 are, for example, perpendicular to each other. In an embodiment, the first electrode pattern units 111 included in the first metal mesh layer 110 are a plurality of meshes arranged in an array. Take FIG. 3A as an example. The first electrode pattern units 111 are a plurality of meshes, which are respectively arranged in the first direction 611 and the second direction 612, and the first direction 611 and the second direction 612 are, for example, perpendicular to each other.

The first metal mesh layer 110 within the non-first electrode pattern units distribution area 118 includes a plurality of thin metal wires. The thin metal wires 117 are connected to the touch electrode units 115 located at both sides of the non-first electrode pattern units distribution area 118. For example, two ends of a thin metal wire 117 are respectively connected to a touch electrode unit 115 for signal transmission. In a specific embodiment, the wire width of the thin metal wires 117 is thinner than the first wire width d of the first electrode pattern units 111 and the second wire width d' of the second electrode pattern units 211; as a result, the thin metal wires 117 cause less interference to the second electrode pattern units 211 of the second metal mesh layer 210; that is, it does not cause serious interference to the antenna magnetic field due to the presence of metal in the non-first electrode pattern units distribution area 118.

Figure 3B:
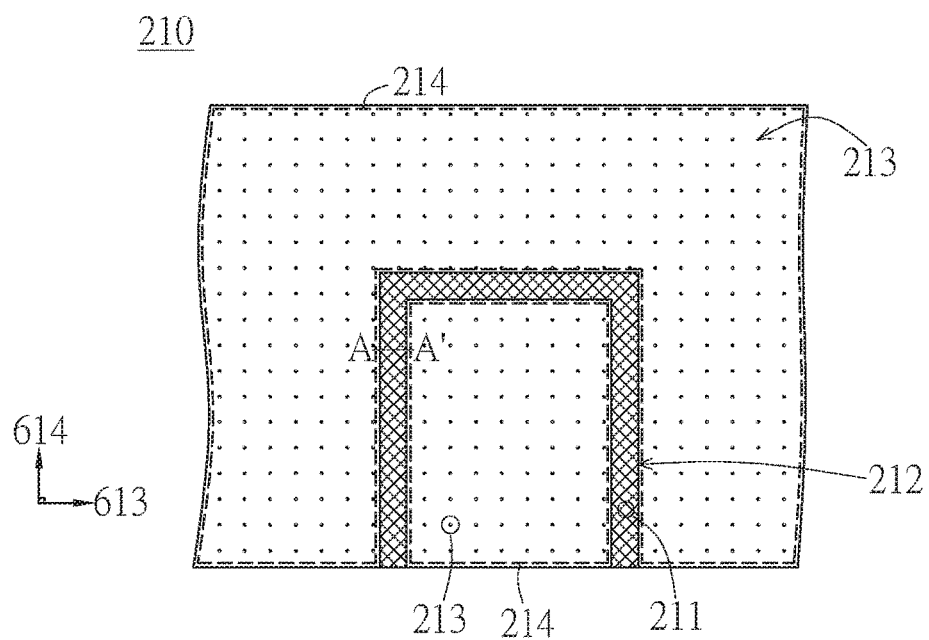
FIG. 3B is a schematic diagram of an embodiment of a second metal mesh layer.

FIG. 3B is a schematic diagram of an embodiment of a second metal mesh layer 210. The second metal mesh layer 210 is made up of a plurality of second electrode pattern units 211 and a plurality of third electrode pattern units 213. In other words, the second electrode pattern units 211 may be regarded as being distributed in the second metal mesh layer 210 to form a second electrode pattern units distribution area 212 (the diamond-shaped plaid area in FIG. 3B). The third electrode pattern units 213 are distributed in the second metal mesh layer 210 to form a third electrode pattern units distribution area 214 (the dotted area in FIG. 3B). The second metal mesh layer 210 includes a second electrode pattern units distribution area 212 and a third electrode pattern units distribution area 213, as shown in FIG. 3B. The pattern of the second electrode pattern units 211 and the pattern of the first electrode pattern units 111 are at least partially identical in shape.

In one embodiment, the pattern of the second electrode pattern units 211 is a mesh. In a specific embodiment, the mesh of the second electrode pattern units 211 is a diamond-shaped mesh. In a specific embodiment, the second electrode pattern units 211 have the same mesh shape as the first electrode pattern units 111. In one embodiment, the mesh having the same shape of the second electrode pattern units 211 and the first electrode pattern units 111 is a diamond-shaped mesh. When the second electrode pattern units 211 and the first electrode pattern units 111 adopt the same pattern, generation of interference fringes can be avoided.

In one embodiment, the second electrode pattern units distribution area 212 is an antenna pattern designed for the antenna circuit; in other words, the second electrode pattern units 211 distributed therein are collectively formed as an antenna. In one embodiment, the antenna pattern formed by the pattern of the second electrode pattern units 211 and the second electrode pattern units distribution area 212 can be adjusted according to design requirements. The embodiment in FIG. 3B illustrates a second electrode pattern units distribution area 212 of a single-turn antenna pattern as an example. In other embodiments, the second metal mesh layer 210 may include a second electrode pattern units distribution area 212 of a multi-turn antenna pattern.

In a specific embodiment, the pattern of the third electrode pattern units 213 is a dot pattern. The third electrode pattern units are arranged in the third direction 613 and the fourth direction 614 respectively, and are distributed in an array on the second metal mesh layer 210. The third direction 613 and the fourth direction 614 are, for example, perpendicular to each other. In a specific embodiment, the first direction 611 and the third direction 613 are the same direction, and the second direction 612 and the fourth direction 614 are the same direction; that is, the plane in which the first metal mesh layer 110 is located is parallel to the plane in which the second metal mesh layer 210 is located.

Figure 4:
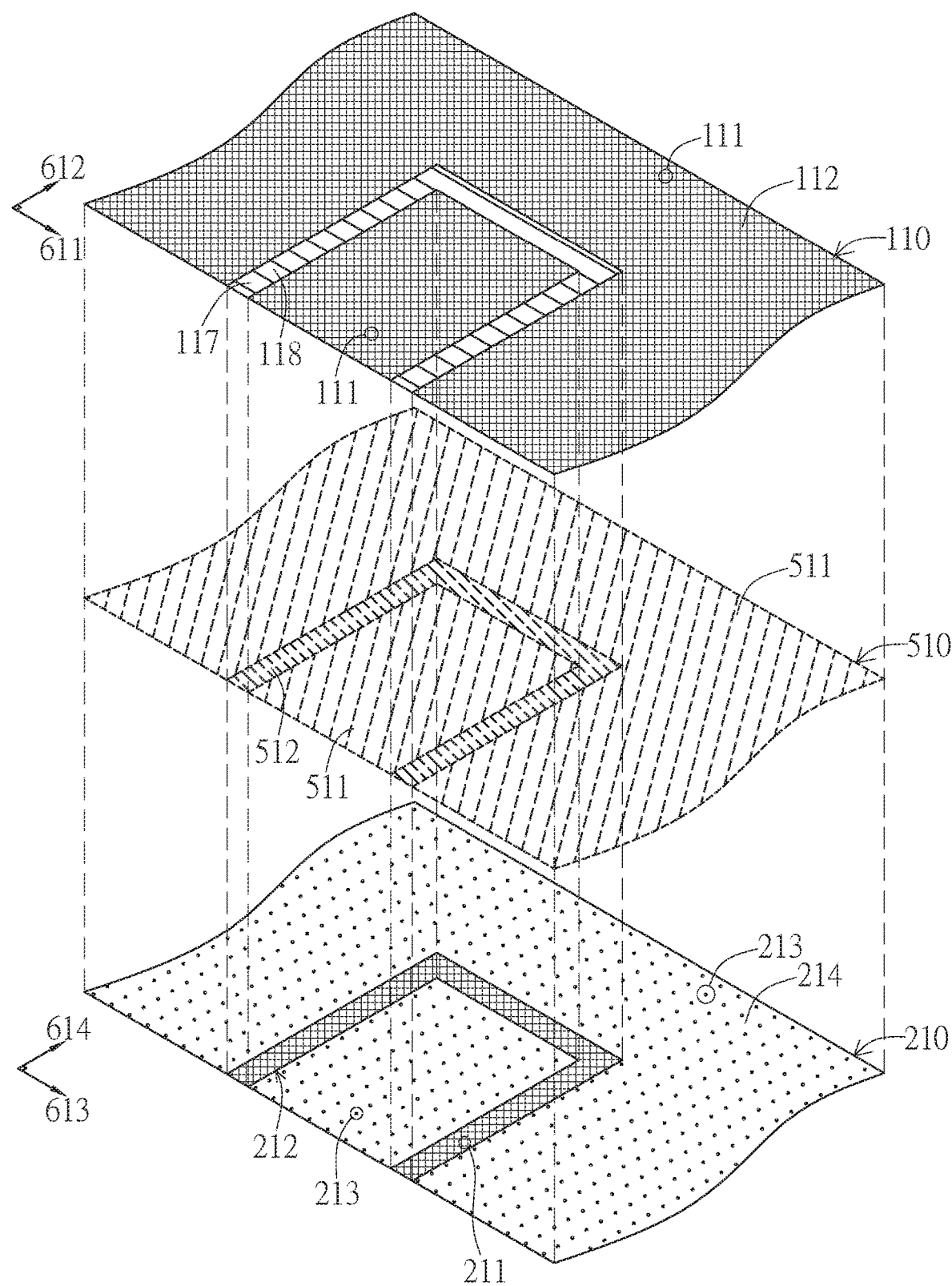
FIG. 4 is a schematic diagram of an embodiment of the projection ranges of a first metal mesh layer and a second metal mesh layer.

FIG. 4 is a schematic diagram of an embodiment of projection ranges of a first metal mesh layer 110 and a second metal mesh layer 210. As shown in FIG. 4, on a virtual projection surface 510 parallel to the first metal mesh layer 110, a first vertical projection range 511 of the shape of the first electrode pattern units distribution area 112 (the diamond-shaped plaid area of 110 in FIG. 4) and a second vertical projection range 512 of the shape of the second electrode pattern units distribution area 212 (the diamond-shaped plaid area of 210 in FIG. 4) are staggered. Specifically, the first vertical projection range 511 on the virtual projection surface 510 projected from the first electrode pattern units distribution area 112 and the second vertical projection range 512 on the virtual projection surface 510 projected from the second electrode pattern units distribution area 212 do not overlap; that is, the non-first electrode pattern unit distribution area 118 of the first metal mesh layer 110 is bigger than the second electrode pattern units distribution area 212 of the second metal mesh layer 210. When the layers are stacked up, by staggering the first electrode pattern units distribution area 112 and the second electrode pattern units distribution area 212, the antenna pattern of the second metal mesh layer 210 (the diamond-shaped plaid area of 210 in FIG. 4) corresponds to the hollow area of the first metal mesh layer 110 (the horizontal striped area of 110 in FIG. 4) to reduce the interference of the wireless communication signal from the first metal mesh layer 110 to the second metal mesh layer 210.

In one embodiment, the virtual projection surface 510 is a projection plane of the first metal mesh layer 110; in another embodiment, the virtual projection surface 510 is a projection plane of the second metal mesh layer 210. In one embodiment, the virtual projection surface 510 is a plane where the first metal mesh layer 110 locates; in another embodiment, the virtual projection surface 510 is a plane where the second metal mesh layer 210 locates.

Figure 5:
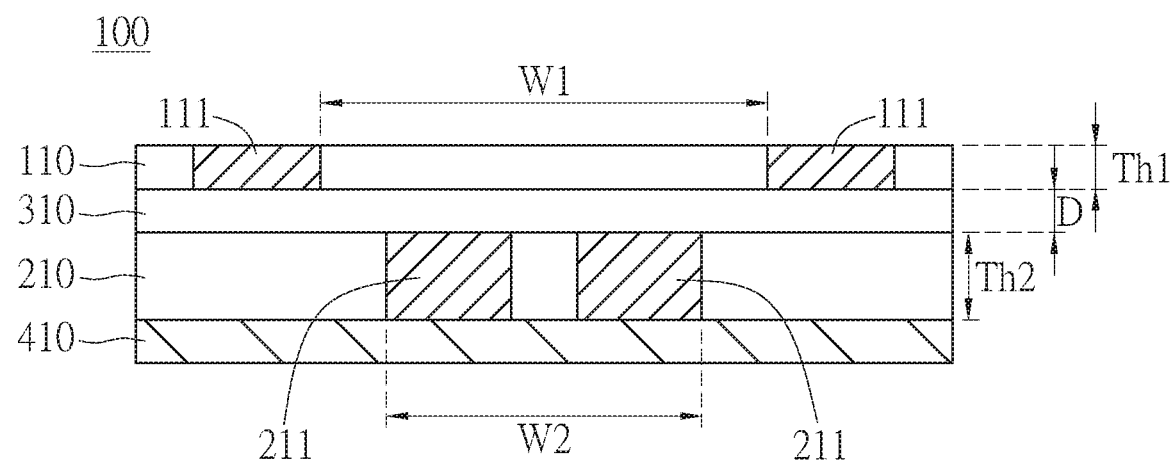
FIG. 5 is a schematic diagram of an embodiment of an A-A' cross-sectional view of an electronic device.

FIG. 5 is a schematic diagram of an embodiment of an A-A' cross-sectional view of an electronic device 100. The corresponding position of section A-A' is also marked in FIGS. 3A and 3B. As shown in FIG. 5, the first metal mesh layer 110 and the second metal mesh layer 210 are separated by a retreat distance D. Reducing the retreat distance D can reduce the module thickness of the electronic device 100. In a specific embodiment, the retreat distance is between 0 mm and 1 mm.

As shown in FIG. 5, the first metal mesh layer 110 has a first layer thickness Th1, and the second metal mesh layer 210 has a second layer thickness Th2. The resistance value will become too large if the first metal mesh layer 110 is too thon; however, the manufacturing process of the first metal mesh layer 110 combines the touch sensor manufacturing process and the Liquid Crystal Display (LCD) manufacturing process, accordingly the first layer thickness is greater than 0.5 μm, which is not easy to achieve in the existing process. In an embodiment, the first layer thickness is between 0.1 μm and 0.5 μm.

For the second metal mesh layer, one needs to consider combining the antenna. As far as the antenna is concerned, the high resistance value caused by too low a thickness can result in the malfunction of the antenna. As a result, the second layer needs an electroplating process to increase its thickness; consequently, the second layer thickness Th2 is greater than the first layer thickness Th1. The second layer thickness Th2 is related to the first wire width d of the metal mesh of the first metal mesh layer 110, and may affect the transmittance at a large viewing angle. In a specific embodiment, the second layer thickness Th2 is 1 to 2 times the first wire width d to achieve a better balance. In one embodiment, a width of the second metal mesh layer can be identical to the first wire width d.

As shown in the embodiment in FIG. 5, in the A-A' section, the non-first electrode pattern unit distribution area 118 has a first width W1, and the second electrode pattern units distribution area 212 has a second width W2; the first width W1 is greater than the second width W2. That is, the vertical projection range of the virtual projection surface 510 projected from the first electrode pattern units distribution area 112 does not overlap with that of the second electrode pattern units distribution area 212. When the second width W2 is smaller than the first width W1, the interference of the antenna magnetic field generated from the first electrode pattern units 111 to the second electrode pattern units 211 can be reduced.

Figure 6A:
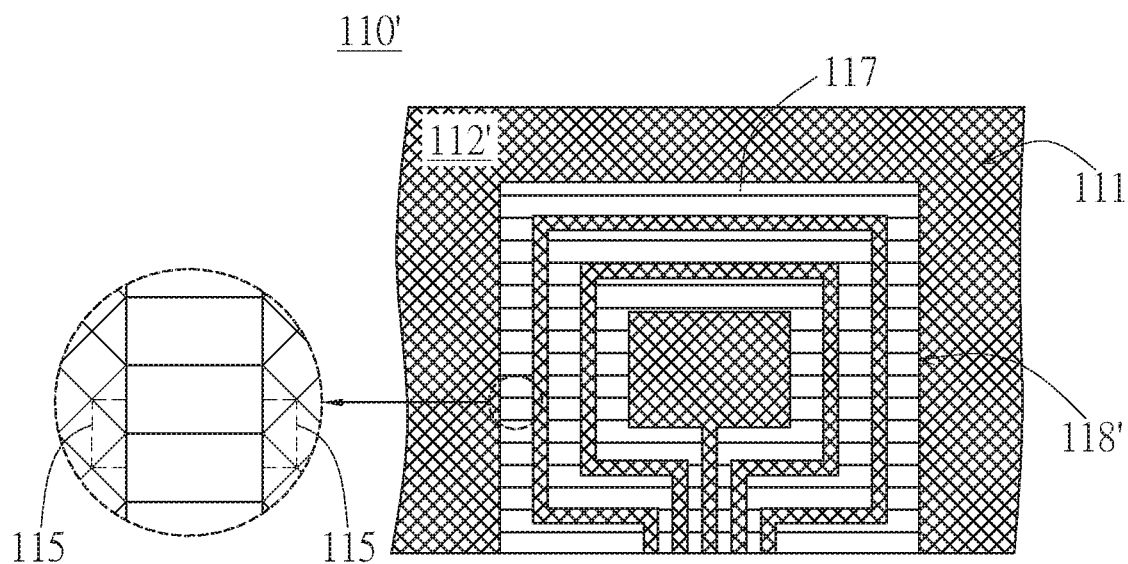
FIG. 6A is a schematic diagram of another embodiment of a first metal mesh layer.
Figure 6B:
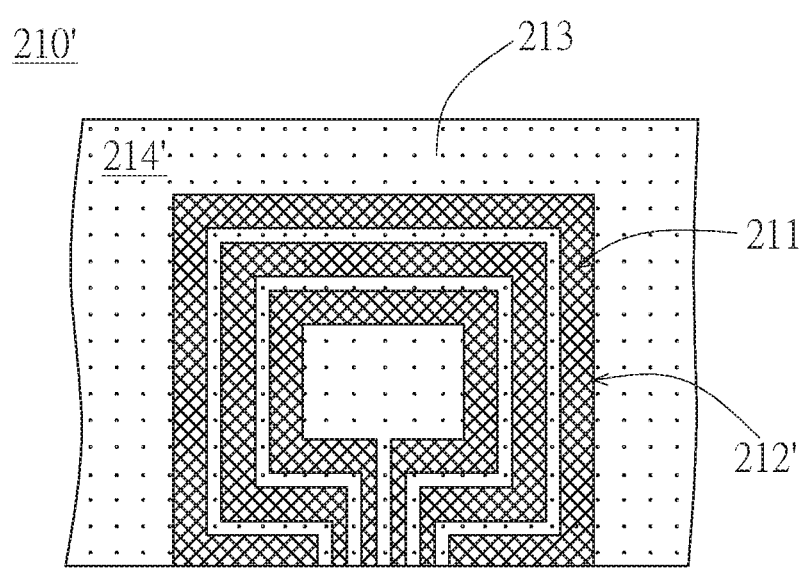
FIG. 6B is a schematic diagram of another embodiment of a second metal mesh layer.

FIG. 6A is a schematic diagram of another embodiment of a first metal mesh layer 110'; FIG. 6B is a schematic diagram of another embodiment of a second metal mesh layer 210'. FIG. 6A and FIG. 6B differ from FIG. 3A and FIG. 3B in that the antenna pattern formed by the second electrode pattern units distribution area 212' (the diamond-shaped plaid area in FIG. 6B) in the second metal mesh layer 210 in FIG. 6B differs from the antenna pattern formed by the second electrode pattern units distribution area 212 in FIG. 3B (the diamond-shaped plaid area in FIG. 3B). The antenna pattern in FIG. 3B is single-turn while that in FIG. 6B is multi-turn. The non-first electrode pattern unit distribution area 118' (the horizontal striped area in FIG. 6A) in the first metal mesh layer 110' in FIG. 6A corresponds to the second electrode pattern units distribution area 212' (the diamond-shaped plaid area) in the second metal mesh layer 210' in FIG. 6B. The non-first electrode pattern unit distribution area 118' corresponding to the second electrode pattern units distribution area 212' is hollowed out to reduce the interference of the wireless communication signal from the first metal mesh layer 110' to the second metal mesh layer 210'. Furthermore, in the hollowed non-first electrode pattern cell distribution region 118', the thin metal wires 117 are also connected to the touch electrode units 115 located at both sides of the non-first electrode pattern units distribution area 118' for signal transmission.

Figure 7:
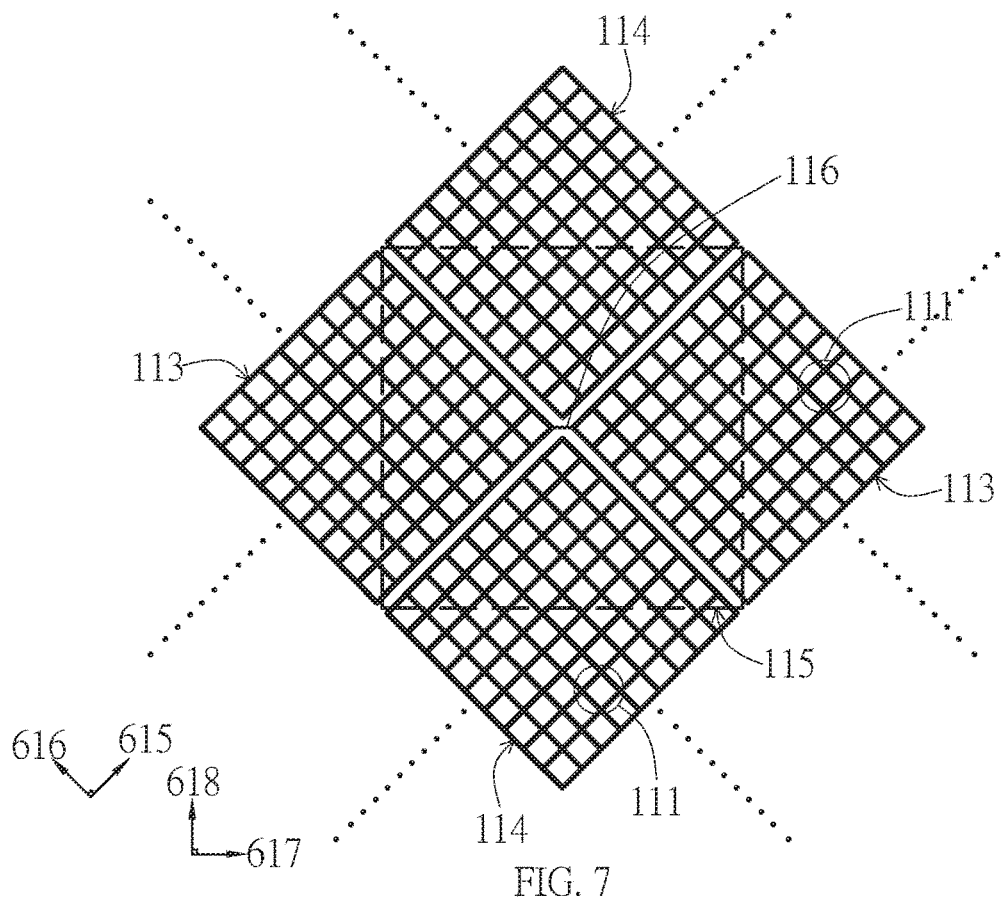
FIG. 7 is a schematic diagram of an embodiment of the layout of the drive electrodes and the detection electrodes.

FIG. 7 is a schematic diagram of an embodiment of the layout of the drive electrodes 113 and the detection electrodes 114. The first electrode pattern units 111 respectively form a plurality of drive electrodes 113 and a plurality of detection electrodes 114. That is, each of the drive electrodes 113 includes a plurality of first electrode pattern units 111, and each of the detection electrodes 114 includes a plurality of first electrode pattern units 111. In an embodiment, the drive electrodes 113 and the detection electrodes 114 are arranged alternately in the fifth direction 615 and the six direction 616 and are distributed in an array on the first metal mesh layer 110; the fifth direction 615 and the sixth direction 616 are, for example, perpendicular to each other. That is, in the fifth direction 615 and the sixth direction 616, any of the two drive electrodes 113 or any of the two drive electrodes 114 are not adjacently spaced, but are staggered in such a manner as "a drive electrode 113—a detection electrode 114—a drive electrode 113" or "a detection electrode 114—a drive electrode 113—a detection electrode 114".

The drive electrodes 113 and the detection electrodes 114 with adjacent sides are disconnected from each other. That is, each one of the drive electrodes 113 is disconnected from its adjacent detection electrodes 114, and each one of the detection electrodes 114 is disconnected from its adjacent drive electrodes 113. The first metal mesh layer 110 further includes a plurality of connection points 116. In an embodiment as shown in FIG. 7, every two drive electrodes 113 with adjacent endpoints are electrically connected via one of the connection points 116 in the seventh direction 617; in another embodiment (not shown), every two detection electrodes 114 with adjacent endpoints are electrically connected via one of the connection points 116 in the eighth direction 618. In an embodiment, the seventh direction 617 is at an angle of 45 degrees to the fifth direction 615. In another embodiment, the eighth direction 618 is at an angle of 45 degrees to the sixth direction 616. In an embodiment, connection points 116 are made of metals with better conductivity, such as copper or aluminum.

Figure 8:
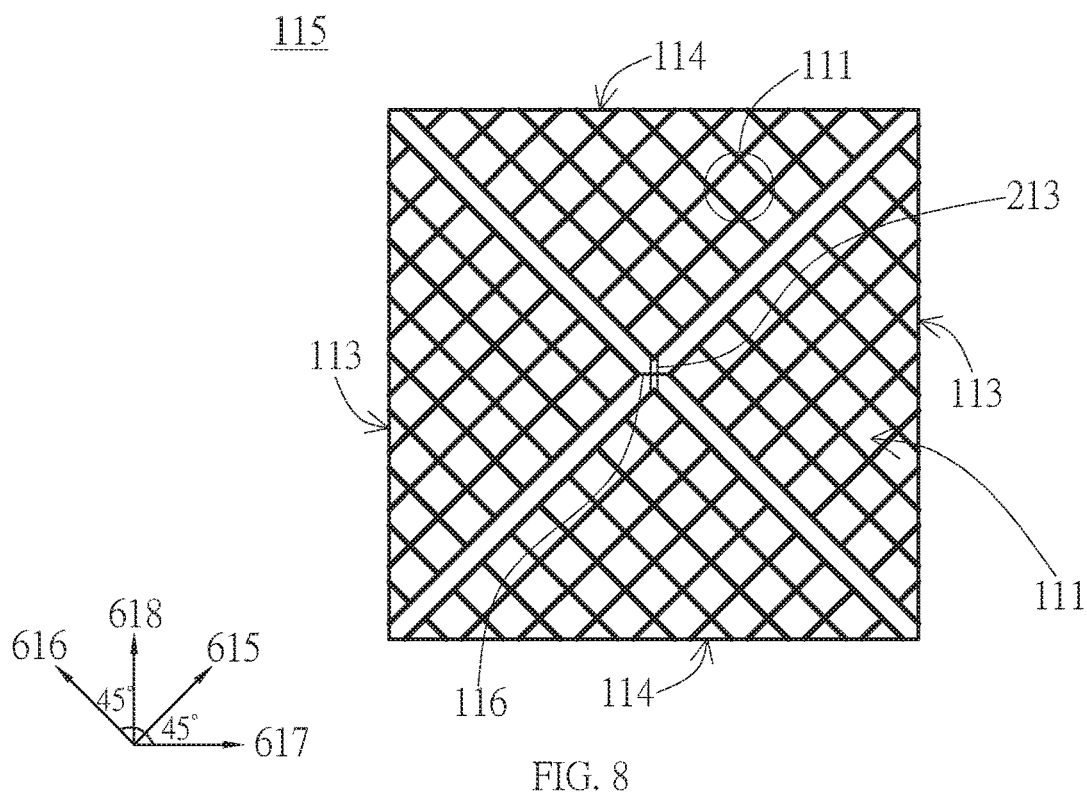
FIG. 8 is a schematic diagram of an embodiment of a single touch electrode unit.

FIG. 8 is a schematic diagram of an embodiment of a single touch electrode unit 115. The metal mesh layer 110 includes a plurality of touch electrode units 115, which are respectively arranged in the seventh direction 617 and the eighth direction 618 and are distributed in an array. Each of the touch electrode units 115 includes two half of the drive electrodes 113 and two half of the detection electrodes 114. The seventh direction 617 and the eighth direction 618 are, for example, perpendicular to each other. FIG. 8 shows one of the touch electrode units 115 as an illustration. In an embodiment, a touch electrode unit 115 is the smallest touch sensing unit with a touch sensing function in the electronic device 100.

As shown in FIG. 8, each of the touch electrode units 115 includes a plurality of partial drive electrodes 113 and a plurality of partial detection electrodes 114. In an embodiment of FIG. 8, each of the touch electrode units 115 includes two half of the drive electrodes 113 and two half of the detection electrodes 114. Every half of the drive electrodes 113 is adjacent to two of the detection electrodes 114 via its two sides respectively, while every half of the detection electrodes 114 is adjacent to two of the drive electrodes 113 via its two sides respectively. The two drive electrodes 113 are opposite to each other at their corners, and the two detection electrodes 114 are opposite to each other at their corners.

As shown in the embodiment of FIG. 8, the two detection electrodes 114 in the same touch electrode unit 115 are electrically connected via one of the third electrode pattern units 213 distributed in the second metal mesh layer 210. In another embodiment (not shown), the two drive electrodes 113 in the same touch electrode unit 115 are electrically connected via one of the third electrode pattern units 213 distributed in the second metal mesh layer 210. The third electrode pattern units 213 and the second electrode pattern units 211 are produced in the same process. Thus in an embodiment, the third electrode pattern units 213 and the second electrode pattern units 211 have the same thickness in the direction perpendicular to the plane formed by the third direction 613 and the fourth direction 614.

In a specific embodiment, the seventh direction 617 is the same direction as the first direction 611, while the eighth direction 618 is the same direction as the second direction 612. The layout direction of the touch electrode units 115 (the seventh direction 617 and the eighth direction 618) is not perpendicular to the layout direction of the adjacent drive electrodes 113 and the detection electrodes 114 (the fifth direction 615 and the sixth direction 616). In a specific embodiment, the seventh direction 617 and the eighth direction 618 are respectively at an angle of 45 degrees to the fifth direction 615 and the sixth direction 616. That is, the layout direction of the touch electrode units (the seventh direction 617 and the eighth direction 618) is at an angle of 45 degrees with the layout direction of the adjacent drive electrodes 113 and the detection electrodes 114 (the fifth direction 615 and the sixth direction 616).

Figure 9:
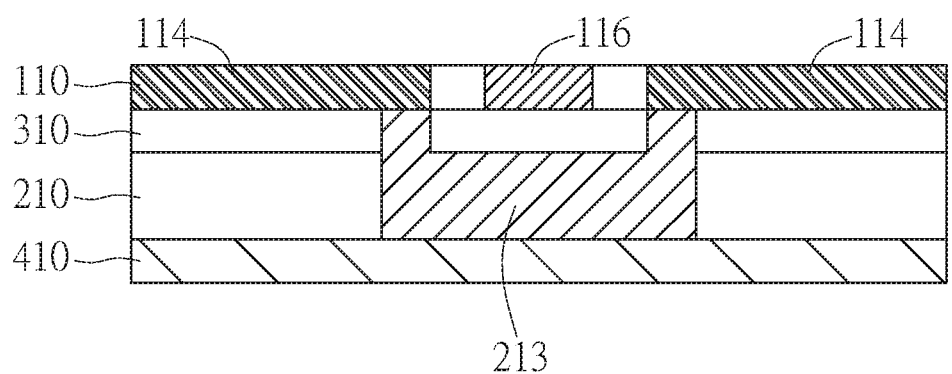
FIG. 9 is a schematic diagram of a section view of an embodiment of a connection method of the detection electrode.

FIG. 9 is a schematic diagram of a section view of an embodiment of a connection method of the detection electrode 114. Two detection electrodes 114 in the same touch electrode unit 115 can pass through the insulator 310 to be electrically connected via the third electrode pattern units 213 on the second metal mesh layer 210, as shown in FIG. 9. FIG. 9 is a schematic diagram of an embodiment of the detection electrodes 114 corresponding to FIG. 8 electrically connected via the third electrode pattern units 213. In another embodiment (not shown), the two drive electrodes 113 in the same touch electrode unit 115 can also pass through the insulator 310 to be electrically connected via the third electrode pattern units 213 on the second metal mesh layer 210. The way it connects is the same as the way the detection electrodes 114 connects to the third electrode pattern units 213 in FIG. 9. The main function of the third electrode pattern units 213 is to electrically connect the adjacent two detection electrodes 114 in a touch electrode unit 115 (as shown in FIG. 9), or to electrically connect the adjacent two drive electrodes 113 in a touch electrode unit 115 (not shown). The thicker thickness of the third electrode pattern units 213 results in smaller resistance and better touch effect. In an embodiment, the third electrode pattern units 213 are made of metals with better conductivity, such as copper or aluminum.

Figure 10:
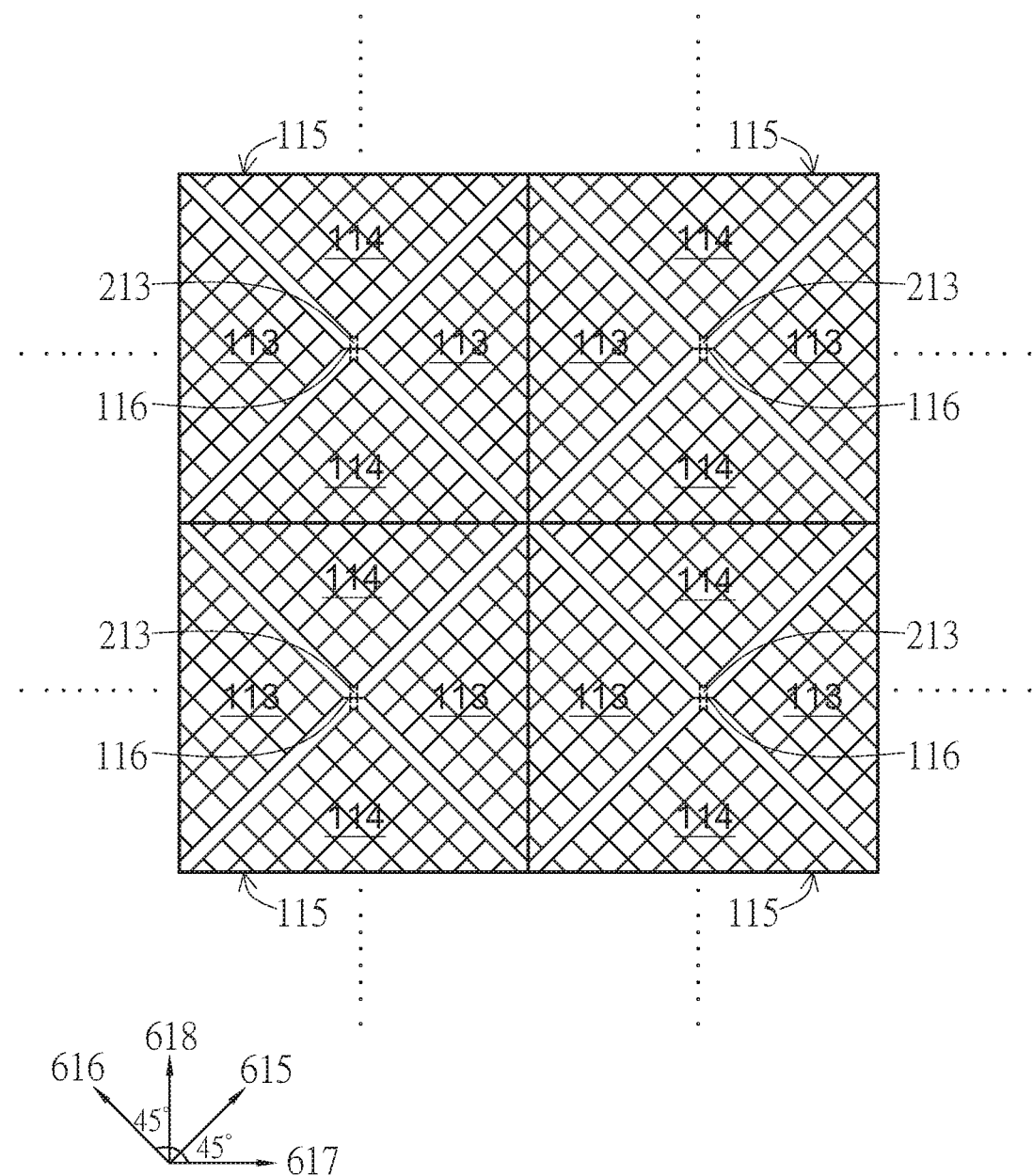
FIG. 10 is a schematic diagram of an embodiment of the layout of a plurality of touch electrode units.

FIG. 10 is a schematic diagram of an embodiment of the layout of a plurality of touch electrode units 115. In the embodiment in FIG. 10, the touch electrode units 115 are distributed in the seventh direction 617 and the eighth direction 618 in an array, and the seventh direction 617 and the eighth direction 618 are in fact perpendicular to each other. The drive electrodes 113 and the detection electrodes 114 are adjacently arranged in the fifth direction 615 and the sixth direction 616 and are distributed in an array; the fifth direction 615 and the sixth direction 616 are, for example, perpendicular to each other. In an embodiment, the seventh direction 617 is at an angle of 45 degrees to the fifth direction 615. In another embodiment, the eighth direction 618 is at an angle of 45 degrees to the sixth direction 616.

As shown in the embodiment of FIG. 10, every two drive electrodes 113 with adjacent endpoints are electrically connected via one of the connection points 116 included in the first metal mesh layer 110, while every two detection electrodes 114 with adjacent endpoints are electrically connected via one of the third electrode pattern units 213. In another embodiment (not shown), every two detection electrodes 114 with adjacent endpoints are electrically connected via one of the connection points 116 included in the first metal mesh layer 110, while every two drive electrodes 113 with adjacent endpoints are electrically connected via one of the of third electrode pattern units 213.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. An electronic device, comprising:
    a touch-sensing first metal mesh layer comprising a plurality of first electrode pattern units;
    an antenna second metal mesh layer disposed on one side of the first metal mesh layer, and made up of a plurality of second electrode pattern units and a plurality of third electrode pattern units, wherein a pattern of the first electrode pattern units and a pattern of the second electrode pattern units are at least partially identical in shapes wherein the second electrode pattern units are distributed in the second metal mesh layer to form a second electrode pattern units distribution area, and the second electrode pattern units distribution area is an antenna pattern; and
    an insulator at least partially disposed between the first metal mesh layer and the second metal mesh layer;
    wherein the second metal mesh layer is electrically connected to the first metal mesh layer via the third electrode pattern units passing through the insulator;
    wherein on a virtual projection surface parallel to the first metal mesh layer, a first vertical projection range projected from the shape of a first electrode pattern units distribution area and a second vertical projection range projected from the shape of a second electrode pattern units distribution area are non-overlapping.

2. The electronic device according to claim 1, wherein the first electrode pattern units comprise a first mesh, the second electrode pattern units comprise a second mesh, and the shape of the first mesh is identical to the shape of the second mesh.

3. The electronic device according to claim 1, wherein the first electrode pattern units respectively form a plurality of drive electrodes and a plurality of detection electrodes, the drive electrodes and the detection electrodes are staggered and distributed in an array, and the each adjacent drive electrode and detecting electrode are disconnected from each other.

4. The electronic device according to claim 3, wherein
    the first metal mesh layer comprises a plurality of touch electrode units distributed in an array, and each touch electrode unit comprises a plurality of partial drive electrodes and a plurality of partial detection electrodes; and
    the layout direction of the touch electrode units is not perpendicular to the layout direction of the adjacent drive electrodes and the detection electrodes.

5. The electronic device according to claim 1, wherein the third electrode pattern units are distributed in an array on the second metal mesh layer.

6. The electronic device according to claim 3, wherein the first metal mesh layer further comprises a plurality of connection points, and every two drive electrodes with adjacent endpoint are electrically connected via one of the connection points; and
    every two detection electrodes with adjacent endpoints are electrically connected via one of the of third electrode pattern units.

7. The electronic device according to claim 3, wherein the first metal mesh layer further comprises a plurality of connection points, and every two detection electrodes with adjacent endpoints are electrically connected via one of the connection points; and
    every two drive electrodes with adjacent endpoints are electrically connected via one of the of third electrode pattern units.

8. The electronic device according to claim 4, wherein the first metal mesh layer within a non-first electrode pattern units distribution area comprises a plurality of thin metal wires, and the thin metal wires are respectively connected to the touch electrode units located at both sides of the non-first electrode pattern units distribution area.

9. The electronic device according to claim 1, wherein
the first metal mesh layer and the second metal mesh layer are separated by a retreat distance, and the retreat distance is less than 1 mm.

10. The electronic device according to claim 1, wherein the first metal mesh layer has a first layer thickness, the second metal mesh layer has a second layer thickness, and the second layer thickness is bigger than the first layer thickness.

11. The electronic device according to claim 10, wherein the first layer thickness is between 0.1 µm and 0.5 µm.

12. The electronic device according to claim 10, wherein the first metal mesh layer has a first wire width, the second layer thickness is 1 to 2 times the first wire width.

\* \* \* \* \*